(12) United States Patent
Street, Jr.

(10) Patent No.: US 8,249,228 B2
(45) Date of Patent: *Aug. 21, 2012

(54) DOCUMENT TRANSMISSION AND ROUTING WITH RECIPIENT CONTROL USEFUL FOR FACSIMILE DOCUMENT TRANSMISSION AND ROUTING

(75) Inventor: William D. Street, Jr., Tucson, AZ (US)

(73) Assignee: Open Text S.A., Luxembourg (LU)

( * ) Notice: Subject to any disclaimer, the term of this patent is extended or adjusted under 35 U.S.C. 154(b) by 306 days.

This patent is subject to a terminal disclaimer.

(21) Appl. No.: 12/641,833

(22) Filed: Dec. 18, 2009

(65) Prior Publication Data

US 2010/0158212 A1    Jun. 24, 2010

Related U.S. Application Data

(63) Continuation of application No. 11/743,416, filed on May 2, 2007, now Pat. No. 7,659,985, which is a continuation of application No. 10/118,541, filed on Apr. 8, 2002, now Pat. No. 7,230,745.

(51) Int. Cl.
*H04M 11/00*    (2006.01)

(52) U.S. Cl. .......... 379/100.05; 379/100.06; 379/100.16
(58) Field of Classification Search .... 379/88.22–88.25, 379/100.01–100.17
See application file for complete search history.

(56) References Cited

U.S. PATENT DOCUMENTS

| | | | | |
|---|---|---|---|---|
| 4,371,752 A | * | 2/1983 | Matthews et al. .......... | 379/88.26 |
| 5,631,948 A | * | 5/1997 | Bartholomew et al. .... | 379/88.18 |
| 5,822,404 A | * | 10/1998 | Cave ......................... | 379/88.13 |

* cited by examiner

*Primary Examiner* — Simon Sing
(74) *Attorney, Agent, or Firm* — Sprinkle IP Law Group

(57) ABSTRACT

Techniques for transmitting information to a recipient under their control are described. In some situations, the techniques are used in conjunction with a fax delivery system to, as part of a connection established to perform a fax transmission, provide a variety of functionalities to a human recipient that is participating as part of the connection, such as when the human recipient is contacted in error. In addition, in some situations an interactive voice response system is used to receive and interpret input from a human recipient, such as in response to one or more control selections or options provided to the human recipient.

20 Claims, 12 Drawing Sheets

DOCUMENT TRANSMISSION AND ROUTING WITH RECIPIENT CONTROL USEFUL FOR FACSIMILE DOCUMENT TRANSMISSION AND ROUTING

CROSS-REFERENCE TO RELATED APPLICATION

This is a continuation of U.S. patent application Ser. No. 11/743,416, filed May 2, 2007, issued as U.S. Pat. No. 7,659,985, which is a continuation of U.S. patent application Ser. No. 10/118,541, filed Apr. 8, 2002, issued as U.S. Pat. No. 7,230,745, which are incorporated by reference herein in their entireties.

TECHNICAL FIELD

The following disclosure relates generally to communicating information, and more particularly to transmitting information to a recipient under their control, such as by a fax delivery system that incorporates interactive human recipient control.

BACKGROUND

While current facsimile (or "fax") transmission systems provide a useful means of communicating documents and other information to human recipients, they suffer from various problems. One such problem is that current fax systems provide little opportunity for a human recipient to control the delivery or routing of a fax document, regardless of whether that fax was sent from/to a conventional fax machine or a computer-assisted fax system. While such recipient control functionality would be useful to virtually any fax recipient, it is particularly beneficial in certain situations.

For example, in situations in which an incorrect telephone number is provided to a sending fax machine, the sending fax machine will attempt to deliver a fax document to a destination telephone station that is not attached to the intended destination fax machine (e.g., to a telephone handset used for voice calls by a human, such as someone other than the intended human recipient). When using a conventional fax machine, a human operator sending the fax may be able to manually detect when the recipient of the call is not a fax machine (e.g., by hearing a human voice on the sending fax machine's speaker) and correct the problem so that the current fax is sent to the correct destination fax machine. However, automated fax systems are not typically monitored by an operator, and thus the sender of a fax document using such a system will not immediately detect such a problem. Even if the sender is eventually informed that the fax was not delivered, the sender may not know why the delivery problem occurred, and thus the delivery problem may not be correctly addressed. Moreover, if the incorrect telephone number was obtained in an automated manner (e.g., retrieved from a computer database), the automated fax system may repeatedly attempt delivery to that same incorrect phone number for this and/or other fax documents to be transmitted to the same intended destination.

Another problem arises in situations where an intended human recipient of a fax uses the same telephone number for both voice calls and fax calls. For example, if the human recipient answers a fax telephone call, the destination fax machine may not be able to be activated to receive the fax even if the destination fax machine is currently available (e.g., if the transmitting fax machine timeouts before the recipient can manually activate the destination fax machine). Conversely, the destination fax machine may be temporarily unavailable when a fax telephone call is received (e.g., while the recipient is using the telephone line for a voice call), and if so the recipient may prefer to have incoming fax documents delivered to another fax machine that is currently available via another telephone number. However, neither automated fax delivery systems nor conventional facsimile machines offer a solution to this problem.

Yet another problem occurs when an intended recipient of a document does not have a fax machine attached to the telephone line that was used for the attempted fax delivery. That recipient may wish to have an incoming fax document delivered to an alternative telephone number or instead not delivered at all. In the case where no delivery is desired, the recipient may also wish to provide a message for the sender.

Existing fax machines and automated fax systems do not currently provide satisfactory solutions for such problems, and as a result important fax documents are sometimes delayed and/or lost without the knowledge of either the sender or the recipient. Thus, there is a need for techniques to solve the above problems and to provide additional related functionality.

DETAILED DESCRIPTION

A software facility is described below for transmitting information to a recipient under their control. In some embodiments, the software facility works in conjunction with a fax delivery system to provide a variety of functionalities to a human recipient that is contacted by the fax delivery system, such as when the human recipient is contacted in error. In addition, in some embodiments an interactive voice response system is used to receive and interpret input from a human recipient, such as in response to one or more control selections or options provided by the software facility.

Figure 1:
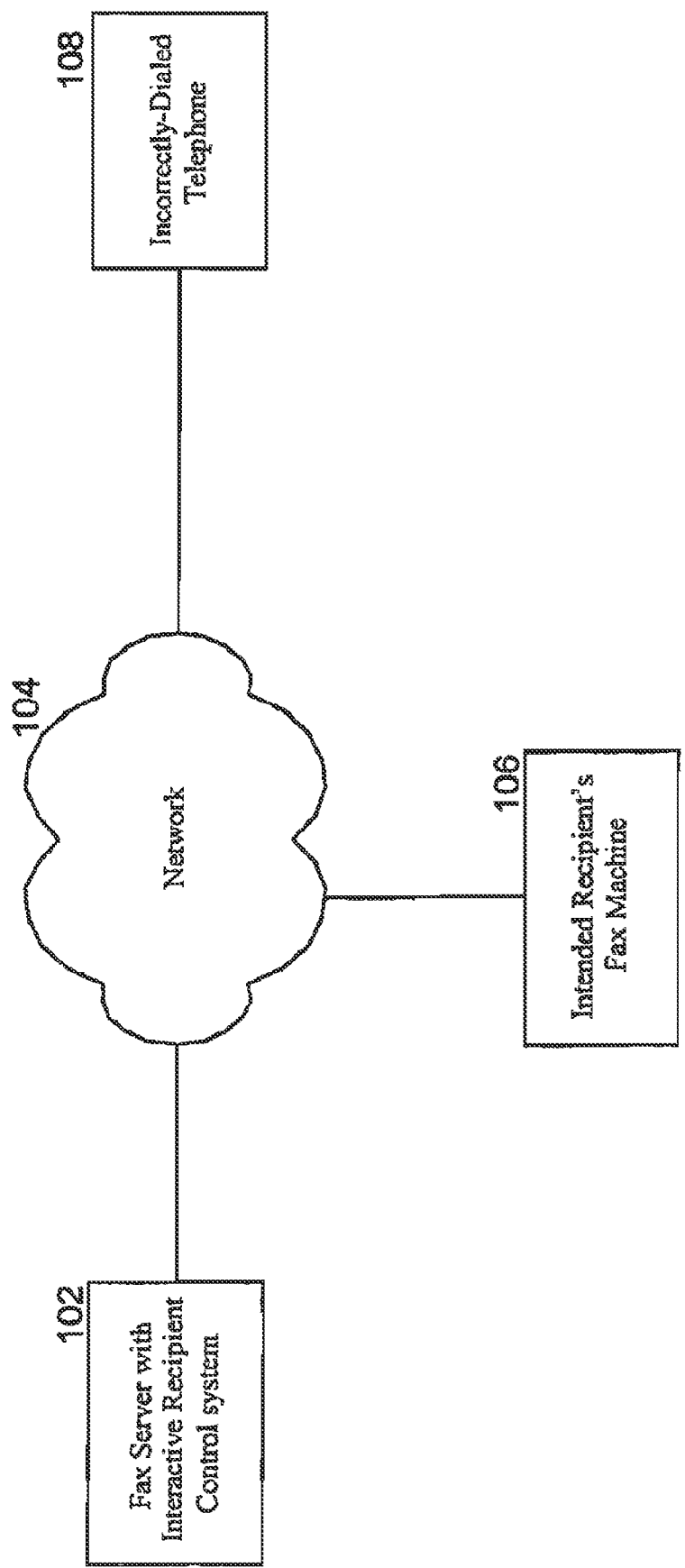
FIG. 1 illustrates an example of providing recipient transmission and routing control in conjunction with a fax delivery system.

As an illustrative example of a situation in which use of the described techniques is beneficial, FIG. 1 illustrates a fax server 102 that is attempting to send a fax transmission to a destination fax machine 106 of an intended human recipient (not shown) via a network 104 (e.g., a public switched telephone network). The network is also connected to a device 108 of an unintended human recipient (not shown), which in the illustrated embodiment is a telephone station. When attempting to send the fax transmission to the fax machine 106, a connection is instead erroneously made with the telephone 108 when the unintended human recipient answers that telephone. In the illustrated embodiment, an Interactive Recipient Control system facility is integrated with the fax server, and upon establishment of the erroneous connection the system detects the presence of the unintended human recipient and provides interactive controls to that human recipient, as described in greater detail below. For example, in some embodiments, the system may detect the presence of the human recipient via speech recognition (e.g., detecting a person answering "hello"), and may provide voice prompts to allow the human recipient to control the fax transmission (e.g., "speak or press '1' to cancel this fax transmission and block future fax transmissions to this number, or speak or press '2' to have this fax transmission resent to this number 5 minutes after disconnection"). After the unintended human recipient provides one or more interactive controls, the system proceeds to control the fax transmission as directed.

For illustrative purposes, some embodiments of the software facility are described below in which the described techniques are used in conjunction with a fax delivery system and in which an interactive voice response system is used to allow a human recipient to control transmission and routing. However, those skilled in the art will appreciate that the techniques of the invention can be used in a wide variety of other situations, some of which are discussed below, and that the invention is not limited to use with fax delivery systems and/or with interactive voice response systems. In addition, in some embodiments the described techniques are provided via software executing on one or more computing devices, but in other embodiments can be provided in other automated manners (e.g., via firmware or hardware embodiments).

Figure 2:
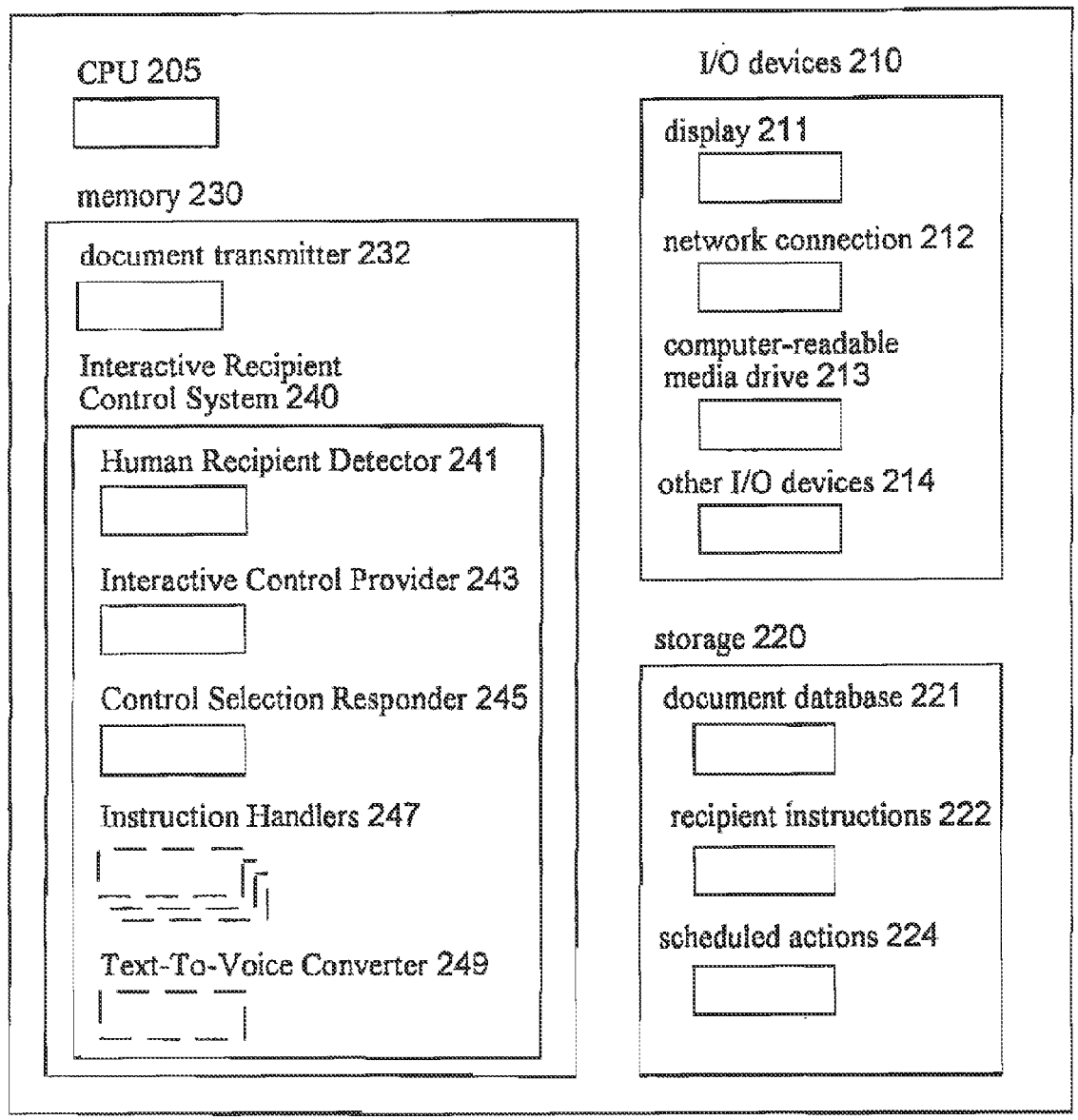
FIG. 2 is a block diagram illustrating an embodiment of a system for providing recipient transmission and routing control.

FIG. 2 illustrates a computing device 200 suitable for executing an embodiment of the Interactive Recipient Control (IRC) system facility to provide interactive transmission and routing control to recipients of documents and other transmissions. The computing device includes a CPU 205, various I/O devices 210, storage 220, and memory 230. The I/O devices include a display 211, a network connection 212, a computer-readable media drive 213, and other I/O devices 214.

In the illustrated embodiment, a document transmitter component 232 is executing in memory to transmit documents (e.g., documents from the document database 221 on storage) as instructed, such as via interactive instructions from one or more users (not shown) or based on document transmissions that were previously scheduled. The document transmissions can be performed in a variety of ways in various embodiments, such as fax transmission over telephone networks (e.g., via analog signals) and/or computer networks (e.g., via TCP/IP communications), email transmissions, 2-way paging, etc. In addition, users can access the document transmitter to provide document transmission instructions in a variety of ways, such as based on physical access to the computing device or instead remotely from client computing devices (e.g., via the Internet and/or the World Wide Web). Some or all of the various described components may also provide various feedback or other general types of information to such users (e.g., in response to user requests), with the information presented to a user on one or more I/O devices of the computing device (e.g., the display 211) and/or on an available I/O device on a remote client system (not shown) in use by the user.

An embodiment of the IRC system 240 is also executing in memory, and it operates in conjunction with the document transmitter to provide interactive transmission routing control to recipients of documents and other transmissions. In the illustrated embodiment, the IRC system includes a Human Recipient Detector component 241, an Interactive Control Provider component 243 and a Control Selection Responder component 245. After the document transmitter establishes a connection with a remote device to which a document or other transmission is intended, the Human Recipient Detector component in the illustrated component determines if a human recipient is currently present at or interacting with the remote device. If a human recipient is detected, the Human Recipient Detector component notifies the Interactive Control Provider component, which then determines which interactive controls are appropriate for the current transmission and may notify the human recipient of some or all of the appropriate interactive controls. The Control Selection Responder component then receives indications of one or more control instructions or other information that are interactively provided by the human recipient, and attempts to control the transmission as directed.

The Human Recipient Detector component can determine if a human recipient is currently present at or interacting with the remote device in a variety of ways in various embodiments. For example, in some embodiments the Human Recipient Detector component may determine when to monitor transmissions for a human presence based on notifications received from the document transmitter (e.g., that a connection has been established), while in other embodiments the Human Recipient Detector may actively monitor some or all outgoing network connections. When monitoring for a human presence, a variety of techniques may similarly be used, such as detecting a human voice or detecting the absence of an expected automated signal. In some situations, the remote device may be able to identify whether a human is present, such as in response to a request for the information.

The Interactive Control Provider component can determine which interactive controls are appropriate for a transmission in a variety of ways in various embodiments. In some embodiments, all document transmissions of a particular type (e.g., fax transmissions) may have the same set of interactive controls that are provided (e.g., based on those interactive controls being predefined for use with fax transmissions), while in other embodiments the Interactive Control Provider component may dynamically determine appropriate interactive controls for each transmission based on some or all of a variety of factors (e.g., the type of the transmission, the identity of the transmission sender, the identity of the transmission receiver, the capabilities of the remote device, a current time-of-day, a current day-of-week, a current week-of-month, a current month-of-year, etc.). Conversely, in some embodiments the Interactive Control Provider may also determine not to provide interactive controls in some situations.

After determining which interactive controls are appropriate for a transmission, the Interactive Control Provider component can notify a human recipient of selected interactive controls in a variety of ways in various embodiments. For example, if the remote device has speaker capabilities or other mechanisms for handling spoken information (e.g., speech-to-text conversion), the Interactive Control Provider may provide to the remote device automated voice prompts or other spoken information about the available interactive controls as part of the established connection. If the remote device instead has other mechanisms for presenting information to the human recipient (e.g., a display screen), information about the available interactive controls can be provided in other manners that can be used by the remote device. In addition, in some situations information may be provided to the remote device in a manner other than the established connection (e.g., via a different type of communications medium).

After information about available interactive controls is provided to the human recipient, the Control Selection Responder component can receive information from the human recipient in a variety of ways in various embodiments. For example, if the remote device has speech input capabilities to receive spoken instructions from a human user of the remote device or has other mechanisms for providing spoken information (e.g., text-to-speech conversion), the Control Selection Responder may receive spoken instructions (e.g., selections of provided choices) as part of the established connection that are related to one or more of the available interactive controls that have been selected. If so, the Control Selection Responder can use speech recognition technology to identify the selected controls. If the remote device instead has other mechanisms for receiving information from the human recipient (e.g., a keyboard, number pad, or stored information about preferences), information about selected interactive controls can be provided in other manners that can be used by the Control Selection Responder component. In addition, in some situations information can be provided from the remote device in a manner other than the established connection.

The Control Selection Responder component can also control the transmission in a variety of ways in various embodiments based on the instructions received from the remote device. In some embodiments, the Control Selection Responder component will control the transmission based on the received instructions directly, while in other embodiments the component may interact with other components to control the transmission. For example, if the received instructions include performing another transmission (e.g., to a different destination, or to the same destination but after a specified delay), the Control Selection Responder component may provide instructions to the document transmitter to perform the transmitting. Alternatively, in some embodiments the IRC system will include one or more optional Instruction Handler components 247 that are executing in memory and that can each handle one or more types of control instructions, and the Control Selection Responder component will interact with the appropriate Instruction Handlers to provide the desired functionality. As more specific examples of types of received instructions in the illustrated embodiment, a human recipient may request that information that would otherwise be provided in electronic form (e.g., a fax or email) be provided in spoken form, and if so an optional Text-To-Voice Converter component 249 executing in memory could be used to provide the information as part of the established connection. Alternatively, the received instructions may indicate to perform some desired action at a future time, and if so the Control Selection Responder component could schedule that action for that time (e.g., by storing appropriate information with the scheduled actions information 224 on storage). In addition, the received instructions may relate not only to the current transmission and/or for the current moment, but also include instructions to be followed at future times (e.g., do not send any future transmissions in a specified format or at certain times), and if so such information can be stored in the recipient instructions information 222 on storage and used as appropriate by the various components of the IRC system and/or the document transmitter.

Those skilled in the art will appreciate that computing device 200 is merely illustrative and is not intended to limit the scope of the present invention. For example, in embodiments in which the described capabilities are provided in conjunction with fax transmissions, computing device 200 may be an automated fax machine that includes additional capabilities not illustrated (e.g., paper document scanning and optical character recognition) and may not include illustrated capabilities (e.g., storage 220 or some of the illustrated types of I/O devices). Alternatively, in other embodiments the computing device 200 may not provide document transmission capabilities as described, and instead the IRC system may interact with one or more document transmitter components operating remotely. More generally, the computing device and remote devices may comprise any combination of hardware or software that can interact to send or receive transmissions, including computers, fax machines, network devices, internet appliances, PDAs, wired and wireless telephones, pagers, electronic organizers, television-based systems and various other consumer products that include inter-communication capabilities. Computing device 200 may also be connected to other devices that are not illustrated, including through one or more networks, such as the public switched telephone network, the Internet, via the World Wide Web (WWW), local area networks, wide area networks, private switch networks, and any other such type of network. In addition, the functionality provided by the illustrated IRC system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

FIGS. 3-10 provide a detailed example of an embodiment in which the described techniques are used in conjunction with a fax delivery system that is transmitting fax documents. As described in greater, detail below, a variety of interactive control selections are provided to a human recipient via spoken information, and the human recipient can select interactive controls via spoken response or numeric keypad response. The provided interactive control selections include mechanisms for informing the recipient about the document, for verifying that the recipient is the intended recipient of the document, and for giving the recipient the ability to route the document to another recipient, to request to have the document transmitted at a later time, to have the document's contents converted to another medium (e.g., voice), etc. Additionally, the recipient is allowed to leave a message for the sender and/or to alert an operator. Those skilled in the art will appreciate that while specific examples of types of interactive controls are thus illustrated in specific combinations, in other embodiments the interactive controls that are provided can vary in numerous ways.

Figure 3A:
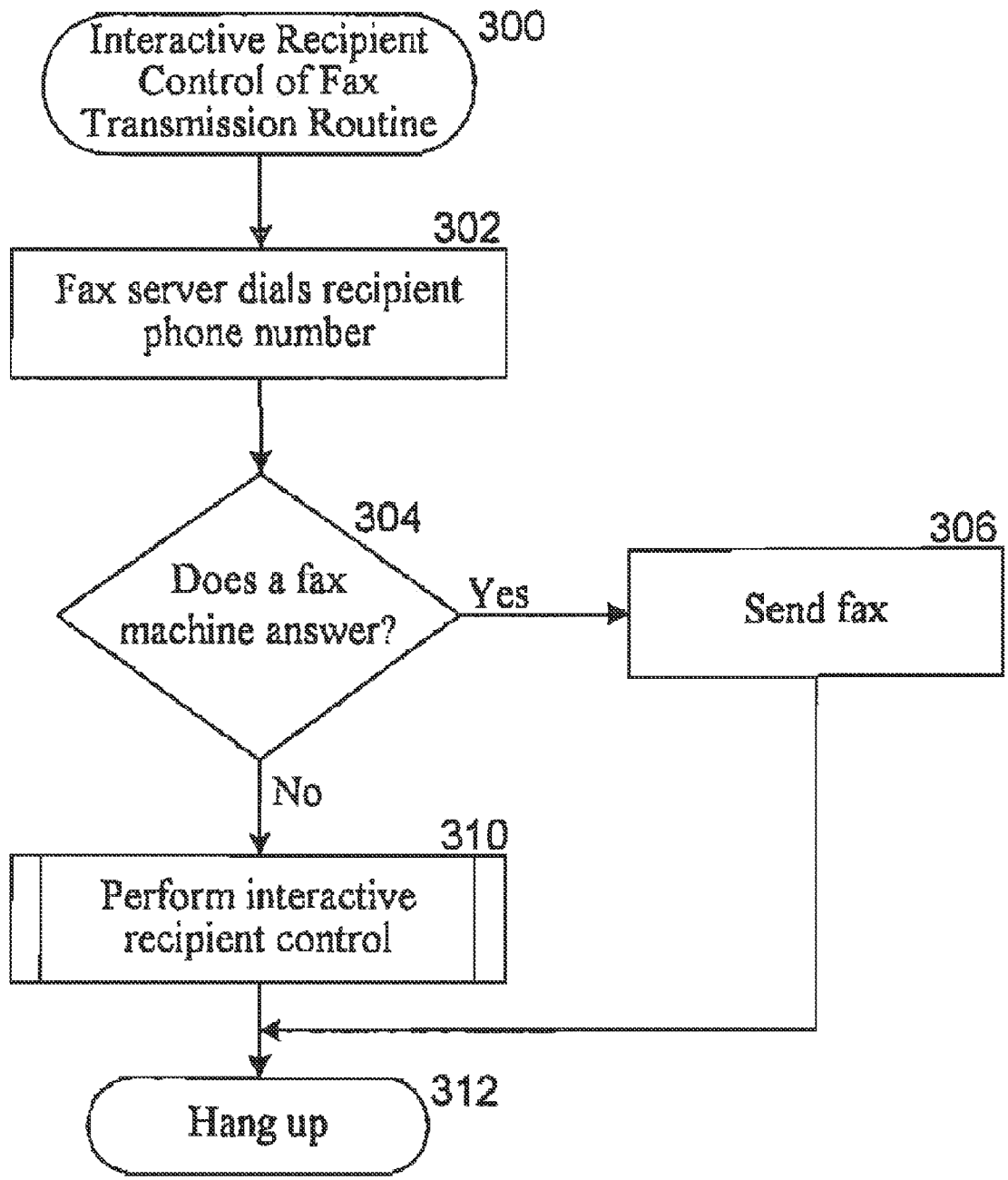
FIG. 3A is a flow diagram of an embodiment of an Interactive Recipient Control Of Fax Transmission routine.

Referring now to FIG. 3A, a flow diagram of an embodiment of an Interactive Recipient Control Of Fax Transmission routine 300 is illustrated. The routine attempts to transmit a fax document to an intended recipient, and provides interactive recipient control via an interactive voice response system if a destination fax machine is not detected. The routine begins in step 302 when a fax server establishes a connection using a specified phone number (e.g., a phone number believed to be associated with a destination fax machine of an intended recipient), such as based on instructions received interactively from a sender or from a previously scheduled transmission action. If it is determined in step 304 that a fax machine answers the call, the fax document is sent in step 306 and the routine continues to step 312 where the connection is terminated. Alternatively, if a fax machine does not answer the call, then in step 310 a subroutine is executed to provide an interactive voice response system with available control selections to a person that has answered the telephone call. After step 310, the routine ends in step 312. As noted above, those skilled in the art will appreciate that similar functionality could be provided for other types of transmissions.

Figure 3B:
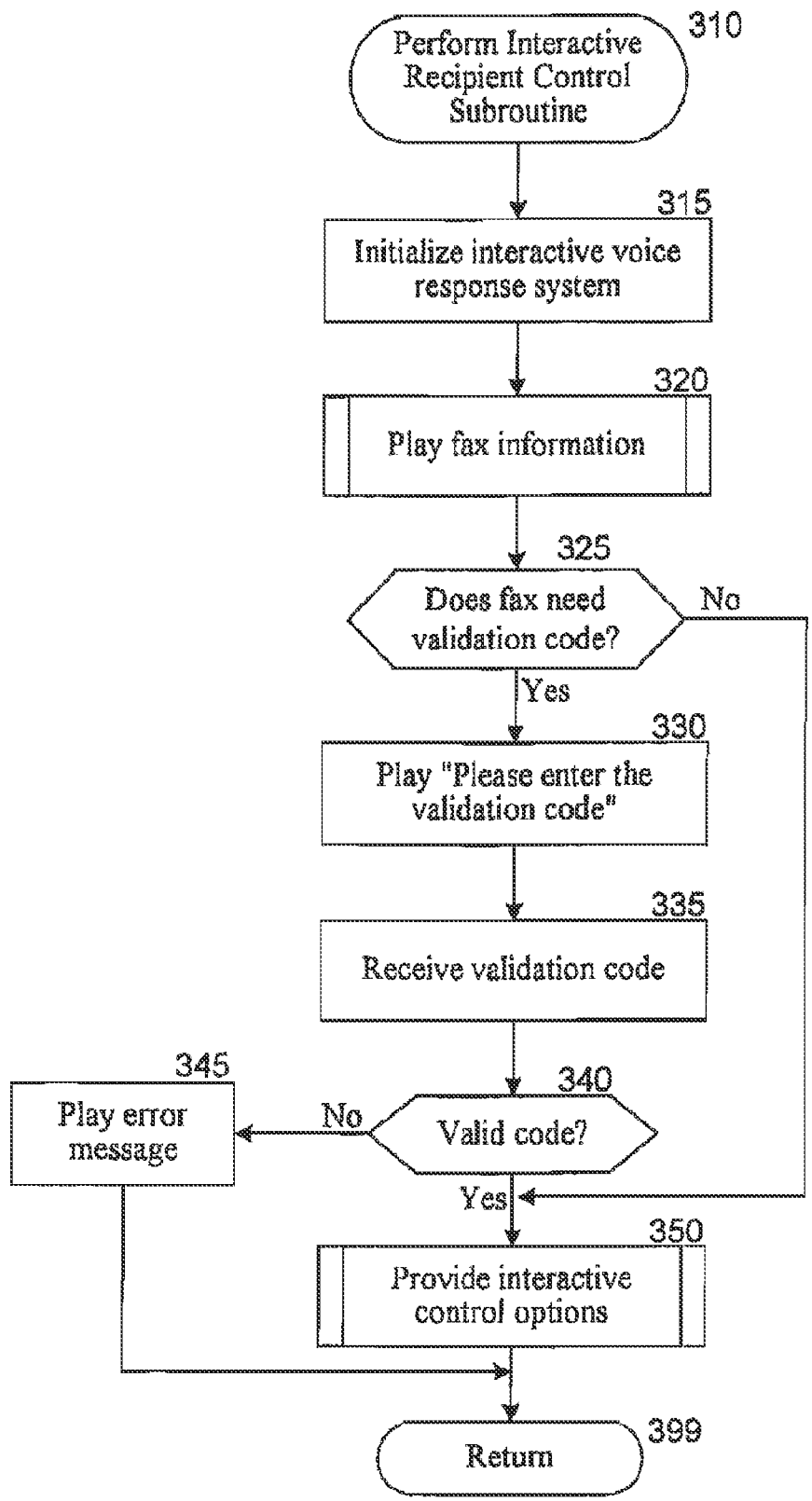
FIG. 3B is a flow diagram of an embodiment of a Perform Interactive Recipient Control subroutine.

FIG. 3B is a flow diagram of an embodiment of a Perform Interactive Recipient Control subroutine 310. The subroutine provides various information about the fax transmission that was attempted, verifies if appropriate that the person with whom the connection is established is authorized to control the transmission and routing, and provides various interactive control options to the person if appropriate. The subroutine begins at step 315 where an interactive voice response system is initialized for use in providing information and options to the person and in receiving responses from the person. The subroutine then continues to step 320 to execute a subroutine to provide to the person various administrative information about the attempted fax transmission.

In step 325, the subroutine determines whether positive delivery verification is required for the attempted fax transmission, such as based on an indication from the sender, on the type of the document or information being transmitted, and/or on the destination telephone number that was used. In the illustrated embodiment, the positive delivery verification is provided by receipt of an appropriate validation code, such as a unique code assigned to a document being transmitted or to the intended recipient. Thus, if positive delivery verification is required, the subroutine continues to step 330 to prompt the person to supply an appropriate code. A validation code is received from the person in step 335, and the subroutine continues to step 340 to determine if the code is valid. If not, the subroutine continues to step 345 to play an error message to the person. If it is instead determined in step 340 that a valid code was provided or in step 325 that a validation code was not needed, the subroutine continues to step 350 to execute a subroutine to provide interactive controls to the person. After steps 345 or 350, the subroutine continues to step 399 and returns.

Figure 4:
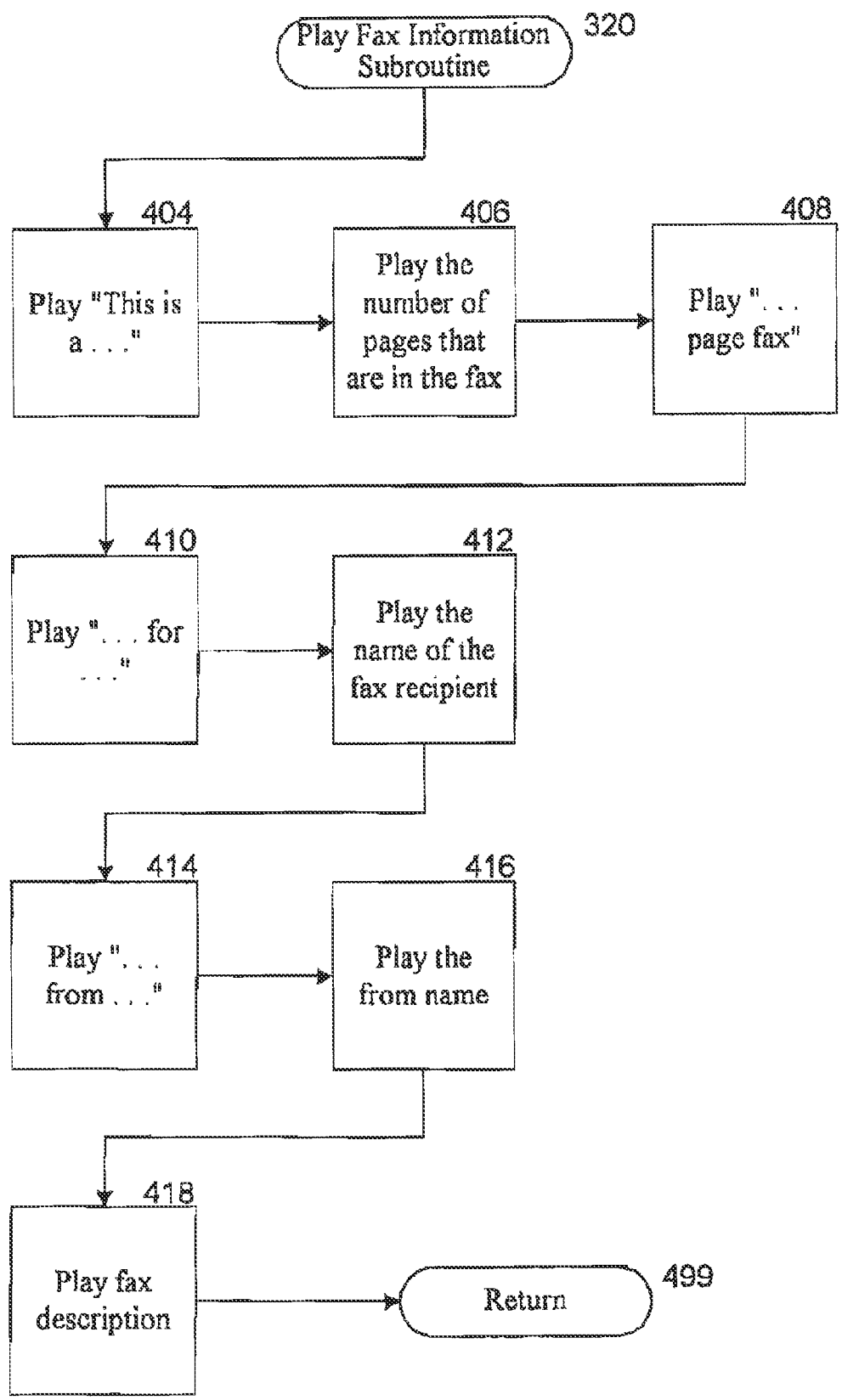
FIG. 4 is a flow diagram of an embodiment of a Play Fax Information subroutine.

FIG. 4 is a flow diagram of an embodiment of a Play Fax Information subroutine 320. The subroutine provides a variety of administrative information related to a fax transmission, and begins in step 404-408 where the subroutine indicates the number of pages of the fax transmission. In steps 410-416, the subroutine plays the name of the intended recipient as well as the name of the sender of the document. The name of the recipient may include information about an individual and/or entity (e.g., a company), and can be determined in various ways, such as from a phonebook entry used when initiating the connection, based on a text-to-speech conversion of information that is part of the fax transmission (e.g., information on a cover sheet), or from information recorded by the sender when the transmission was initiated. Similarly, the name of the sender may include information about an individual and/or entity, and can be determined in various ways (e.g., from a phonebook entry, from a text-to-speech conversion of information that is part of the fax transmission, or from information recorded by the sender when the transmission was initiated). After step 416, the subroutine continues to step 418 to play a description of the information being transmitted, such as information recorded by the sender when the transmission was initiated or via a text-to-speech conversion of part of the fax transmission (e.g., the first paragraph on a page that is not part of the cover sheet). The subroutine then continues to step 499 and returns.

Figure 5:
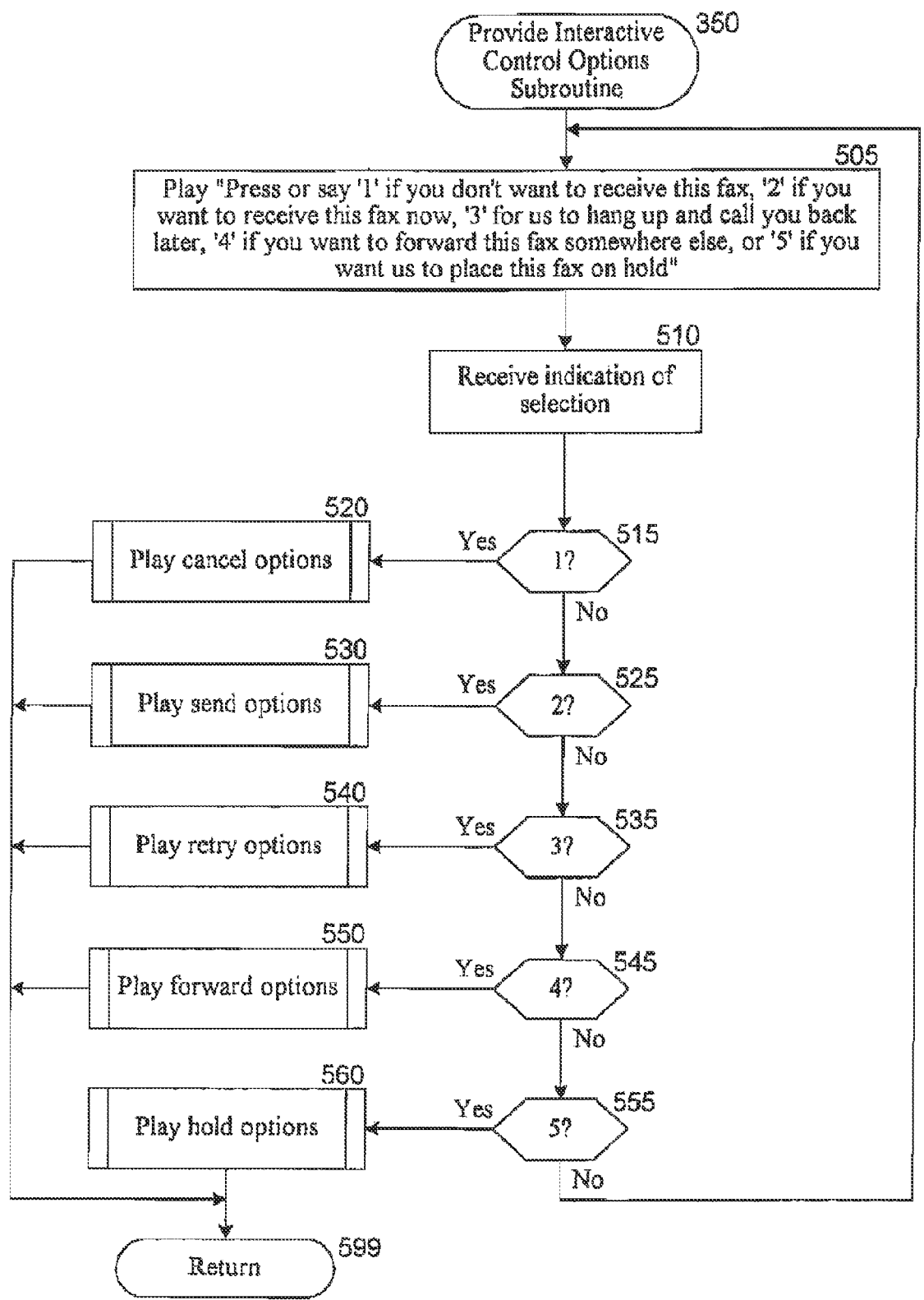
FIG. 5 is a flow diagram of an embodiment of a Provide Interactive Control Options subroutine.

FIG. 5 is a flow diagram of an embodiment of a Provide Interactive Control Options subroutine 350. The subroutine provides a variety of interactive control options to the person with whom the connection is established, and responds as appropriate to the options selected by the person. The subroutine begins at step 505 where the person is prompted to indicate whether they want to receive the fax transmission now, receive the fax transmission later, cancel the fax transmission, forward the fax transmission to another telephone number, or hold this fax transmission for later retrieval. In step 510 the subroutine receives an indication of a response from the person, and analyzes the response if necessary to determine the selection made (e.g., by performing speech-to-text conversion of a spoken response). If it is determined in step 515 that the person wants to cancel the fax transmission, the subroutine continues to step 520 to execute a subroutine to provide various cancellation options. If it is determined in step 525 that the person wants to receive the fax transmission now, the subroutine continues to step 530 to execute a subroutine to provide various send options. If it is determined in step 535 that the person wants to receive the fax transmission later, the subroutine continues to step 540 to execute a subroutine to provide various retry options. If it is determined in step 545 that the person wants to forward the fax transmission to another telephone number, the subroutine continues to step 550 to execute a subroutine to provide various forwarding options. If it is determined in step 555 that the person wants to hold this fax transmission for later retrieval, the subroutine continues to step 560 to execute a subroutine to provide various hold options. If none of these options were selection, the subroutine returns to step 505. Otherwise, after steps 520, 530, 540, 550 or 560, the subroutine continues to step 599 and returns.

Figure 6:
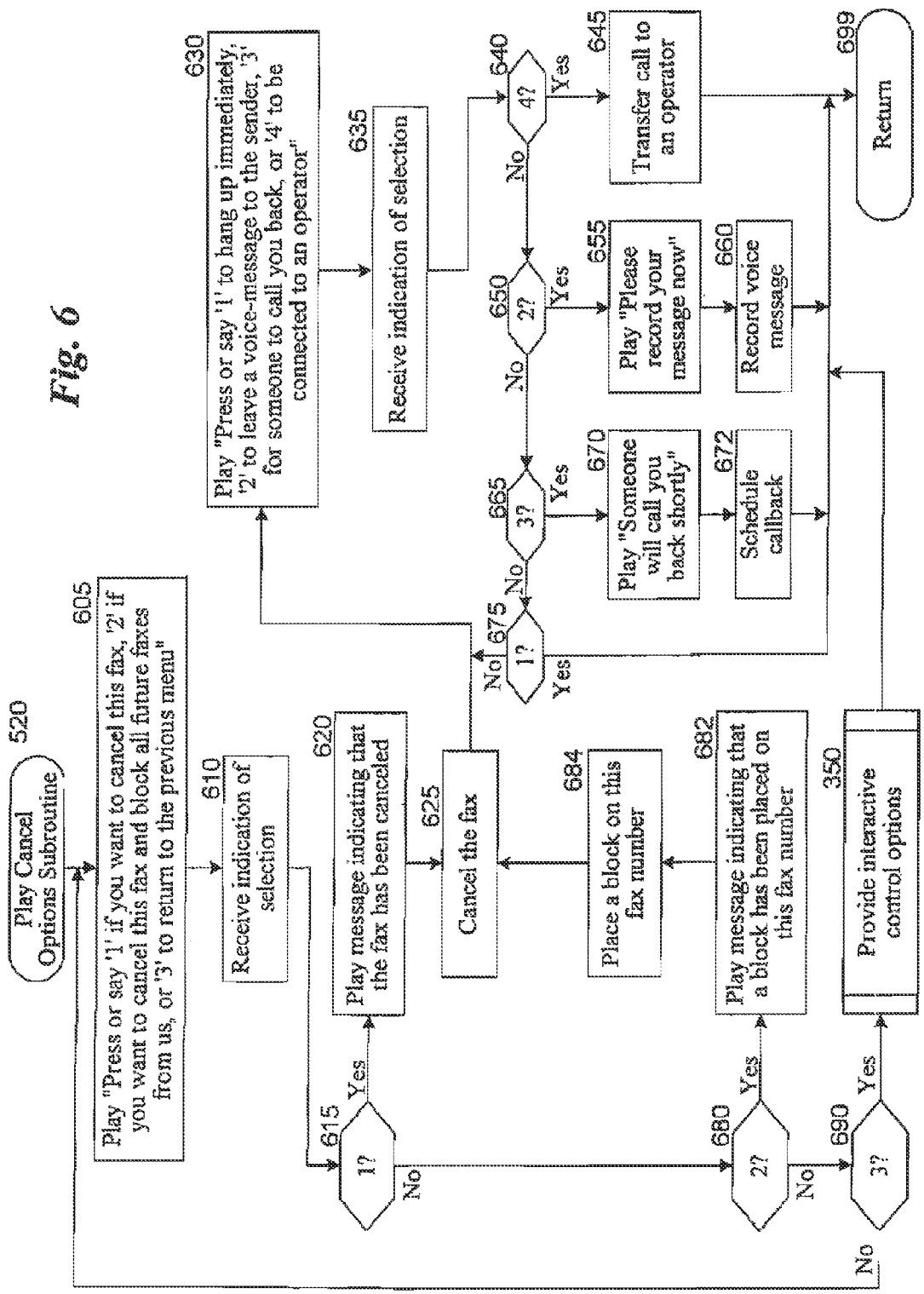
FIG. 6 is a flow diagram of an embodiment of a Play Cancel Options subroutine.

FIG. 6 is a flow diagram of an embodiment of a Play Cancel Options subroutine 520. The subroutine allows the person to cancel delivery of this fax, as well as to optionally cancel future deliveries of faxes to this phone number. The subroutine begins in step 605 where the person is prompted to indicate whether they want to cancel this fax transmission, cancel this and future fax transmissions, or return to the previous menu. In step 610 the subroutine receives an indication of a response from the person, and analyzes the response if necessary to determine the selection made. If it is determined in step 615 that the person wants to cancel this fax transmission, the subroutine continues to step 620 to indicate to the person that the fax has been canceled, and then continues to step 625 to cancel the fax transmission (e.g., by removing a document being transmitted from a queue of documents to be transmitted).

The subroutine next continues to step 630 where the person is prompted to indicate whether they want to hang up immediately, to leave a voice message for the sender, to have an operator (e.g., the sender) call the person back to assist them, or to be connected to an operator immediately. In step 635 the subroutine receives an indication of a response from the person, and analyzes the response if necessary to determine the selection made. If it is determined in step 640 that the person wants to be connected to an operator immediately, the subroutine continues to step 645 to transfer the call to an operator. If it is determined in step 650 that the person wants to leave a voice message for the sender, the subroutine continues to steps 655 and 660 to prompt the person for a message and to record the supplied message so that it can be provided to the sender. If it is determined in step 665 that the person wants to have an operator call them back, the subroutine continues to step 670 to notify the person that the callback will occur and in step 672 schedules the callback. If it is determined in step 675 that the person wants to hang up immediately, or after steps 645, 660 or 672, the subroutine continues to step 699 and returns. If none of these options were selected, the subroutine returns to step 630.

If it is instead determined in step 615 that the selection indication received in step 610 is not to cancel this fax transmission, the subroutine continues to step 680 to determine if the person wants to cancel this and future fax transmissions. If so, the subroutine continues to step 682 to indicate to the person that a block has been placed on this telephone number so that additional faxes will not be sent to it, and then continues to step 684 to place the block as indicated (e.g., by placing the telephone number on a list of blocked telephone numbers or in recipient instructions that will be consulted before performing future fax transmissions). After step 684, the subroutine continues to step 625. In other embodiments, the person may be allowed to specify additional information related to canceling this and/or future fax transmissions, such as a time limit or effective times during which future fax transmissions are to be blocked or indications of certain types of fax transmissions that are to be blocked.

If it is determined in step 680 that the selection indication received in step 610 is not to cancel this and future fax transmissions, the subroutine continues to step 690 to determine if the person wants to return to the previous menu. If so, the subroutine executes a subroutine 350 to provide the previous interactive control options, and then continues to step 699 and returns. If not, the subroutine returns to step 605.

Figure 7:
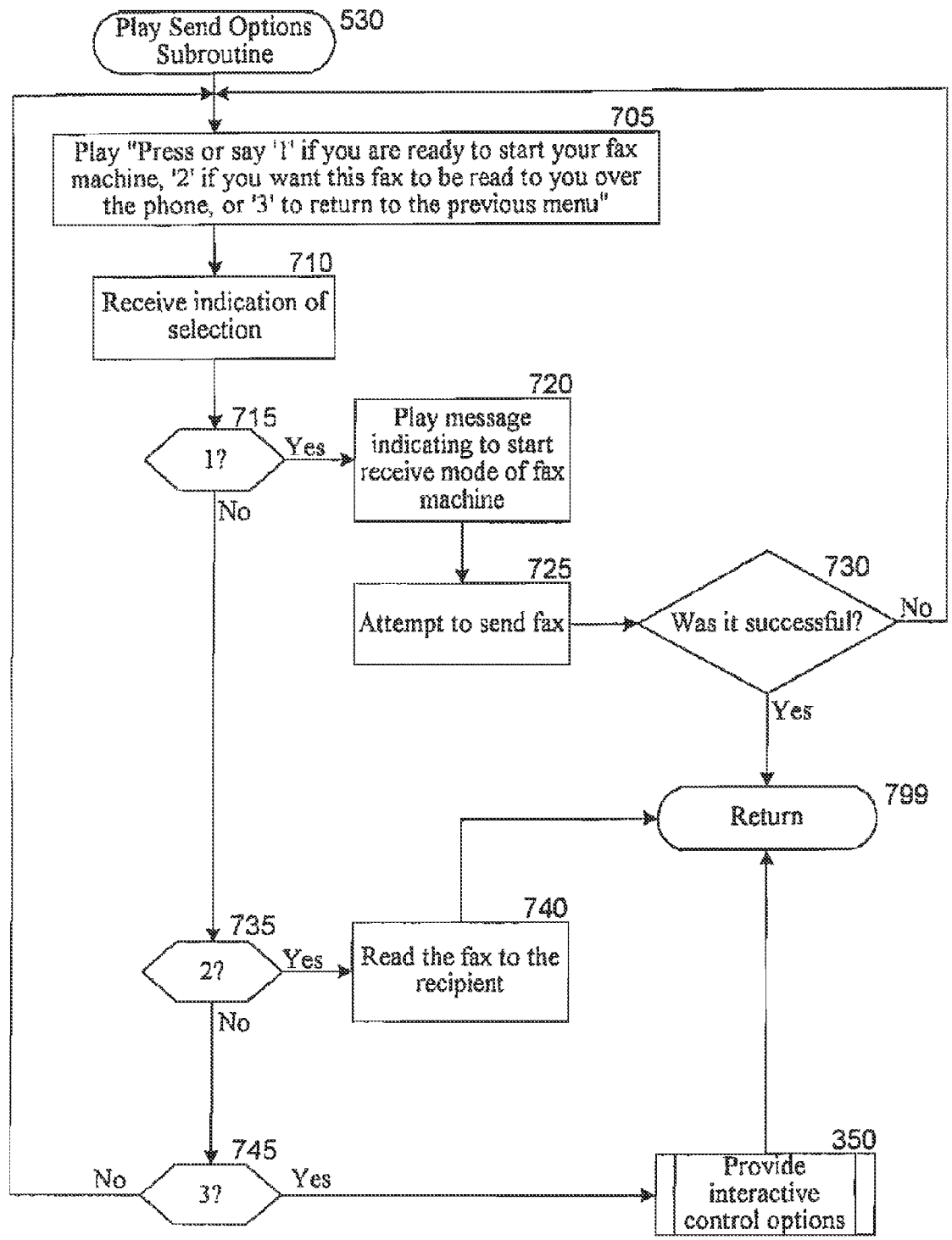
FIG. 7 is a flow diagram of an embodiment of a Play Send Options subroutine.

FIG. 7 is a flow diagram of an embodiment of a Play Send Options subroutine 530. The subroutine allows the person to specify various manners in which the current fax is to be currently delivered to them. The subroutine begins in step 705 where the person is prompted to indicate whether they want to restart the fax transmission immediately as part of the established connection, have the text of the fax be read to them, or return to the previous menu. In other embodiments additional options may be available, such as to have the fax delivered in another manner (e.g., email, telex, instant message, etc.). In step 710, the subroutine receives an indication of a response from the person, and analyzes the response if necessary to determine the selection made. If it is determined in step 715 that the person wants to immediately receive the fax transmission, the subroutine continues to step 720 to indicate to the person to initiate the 'receive' mode of their fax machine and then continues to step 725 to begin another attempt to send the fax transmission. The subroutine then determines in step 730 if the transmission attempt completed successfully, and if not returns to step 705.

If it is instead determined in step 715 that the selection indication received in step 710 is not to immediately restart the fax transmission, the subroutine continues to step 735 to determine if the person wants to have the text of the fax read to them. If so, the subroutine continues to step 740 to read the text, such as by performing an automated text-to-speech conversion of the information to be transmitted. If it is determined in step 735 that the selection indication received in step 710 is not to have the text read, the subroutine continues to step 745 to determine if the person wants to return to the previous menu. If so, the subroutine executes a subroutine 350 to provide the previous interactive control options, and If not the subroutine returns to step 705. After executing subroutine 350 or step 740, or if it was determined in step 730 that the retransmission of the fax was successful, the subroutine continues to step 799 and returns.

Figure 8:
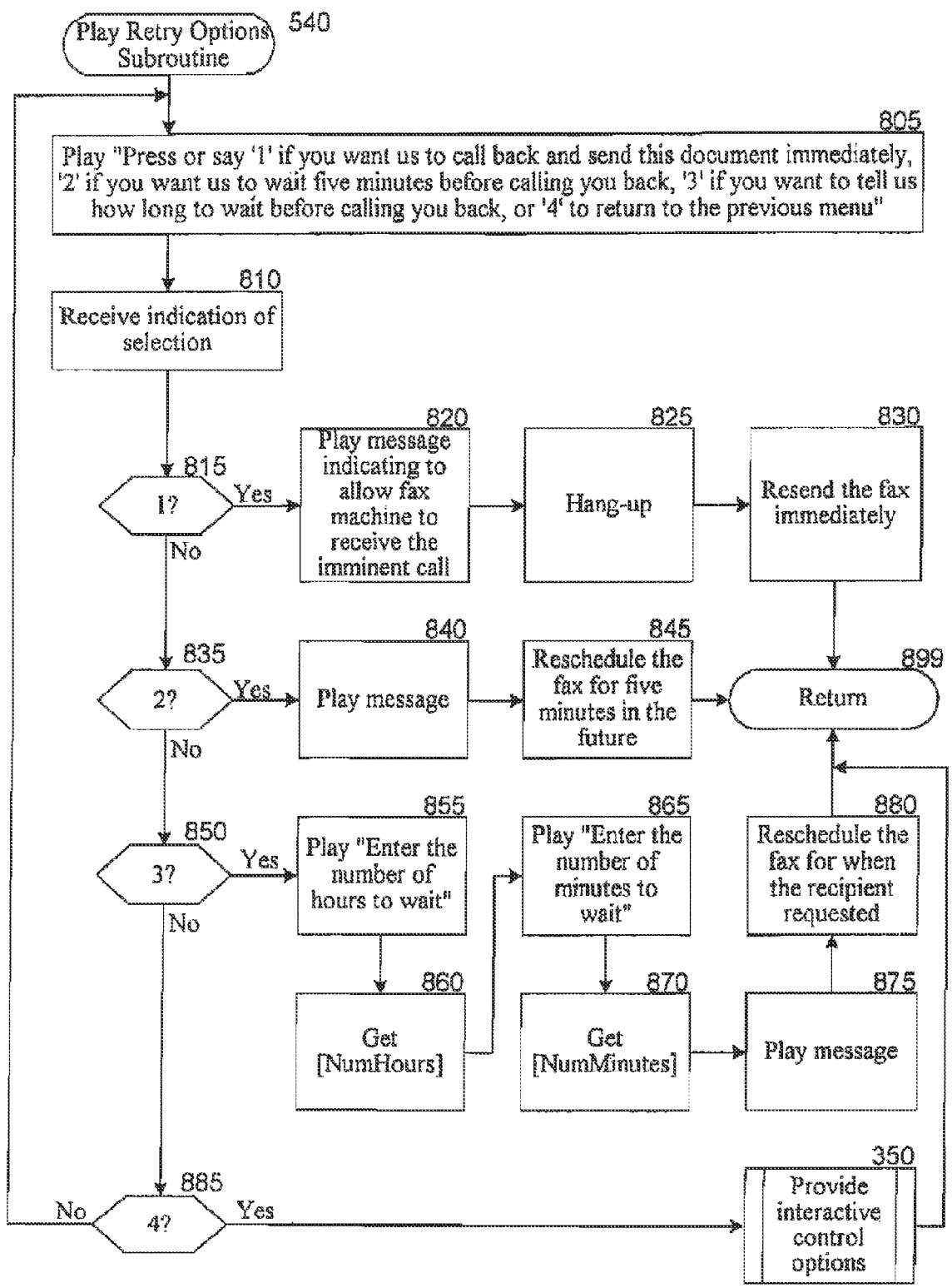
FIG. 8 is a flow diagram of an embodiment of a Play Retry Options subroutine.

FIG. 8 is a flow diagram of an embodiment of a Play Retry Options subroutine 540. The subroutine allows the person to specify various manners in which the current fax is to be delivered to them at a future time. The subroutine begins in step 805 where the person is prompted to indicate whether they want to have the fax transmission resent immediately after the established connection is terminated, want to have the fax transmission resent five minutes after the established connection is terminated, want to have the fax transmission resent after a specified amount of time, or return to the previous menu. In other embodiments, the manner of retry could instead be specified in other ways, such as to occur at a specified time or in a specified manner. After step 805, the subroutine receives in step 810 an indication of a response from the person, and analyzes the response if necessary to determine the selection made.

If it is determined in step 815 that the person wants to have the fax transmission resent immediately after the established connection is terminated, the subroutine continues to step 820 to indicate to the person to allow their fax machine to establish the connection for the imminent phone call, and then continues to step 825 to terminate the current connection. In step 830, the subroutine then initiates a new fax transmission to the same telephone number, and then continues to step 899 and returns. In some embodiments, if a human recipient is again detected for the new fax transmission, the Perform Interactive Recipient Control subroutine 310 will again be initiated to provide additional routing and transmission controls to that human recipient.

If it is determined in step 815 that the person does not want to have the fax transmission resent immediately after the established connection is terminated, the subroutine continues to step 835 to determine if the selection indication received in step 810 is to have the fax transmission resent five minutes after the established connection is terminated. If so, the subroutine continues to step 840 to indicate to the person that the fax transmission will be restarted in five minutes. The subroutine then continues to step 845 to schedule a transmission of the fax for five minutes in the future, and next continues to step 899 and returns. Alternatively, if it is not determined in step 835 that the selection indication received in step 810 is to have the fax transmission resent five minutes after the established connection is terminated, the subroutine continues to step 850 to determine if the selection indication received in step 810 is to have the fax transmission resent after a specified period of time has elapsed. If so, the subroutine continues to steps 855-870 to prompt for and receive an indication of a number of hours and minutes to wait before restarting the fax transmission. In step 875, the subroutine then indicates to the person that the fax transmission will be restarted after the specified period of time has elapsed, and next continues to step 880 to schedule a transmission of the fax to occur after the specified period of time has elapsed. The subroutine then continues to step 899 and returns.

If it is not determined in step 850 that the selection indication received in step 810 is to have the fax transmission resent after a specified period of time has elapsed, the subroutine continues to step 885 to determine if the selection indication received in step 810 is to return to the previous menu. If so, the subroutine executes a subroutine 350 to provide the previous interactive control options, and then continues to step 899 and returns. If not, the subroutine returns to step 805.

Figure 9:
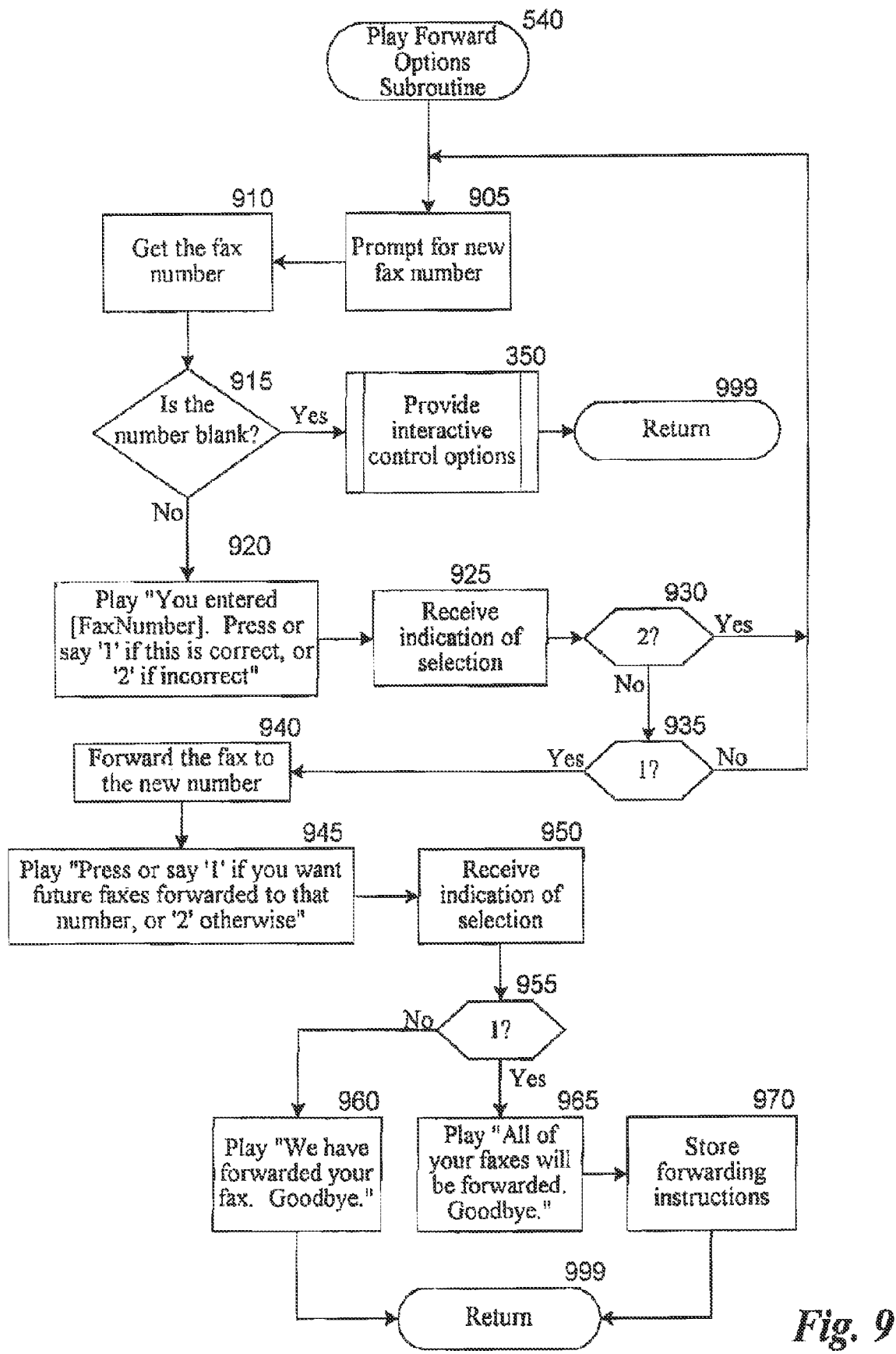
FIG. 9 is a flow diagram of an embodiment of a Play Forward Options subroutine.

FIG. 9 is a flow diagram of an embodiment of a Play Forward Options subroutine 550. The subroutine allows the person to forward this fax to another phone number (e.g., to another recipient), as well as to optionally indicate to forward future faxes to the other phone number. The subroutine begins in step 905 where the person is prompted to supply a new fax number (e.g., via the numeric keypad of the phone or via spoken words), and in step 910 an indication of the new fax number is received and analyzed if necessary to determine the number specified. If it is determined in step 915 that the new fax number is invalid (e.g., the fax number was blank or incomplete), the subroutine executes a subroutine 350 to provide the previous interactive control options, and then continues to step 999 and returns. If it is instead determined in step 915 that the new fax number is valid, the subroutine continues to step 920 to playback the received fax number and to prompt the person to verify that the new fax number is correct. In step 925, an indication of the person's response is received, and unless it is determined in steps 930 and 935 that the person verified the playback number as correct, the subroutine returns to step 905. If it is determined in steps 930 and 935 that the person verified the playback number as correct, the subroutine continues to step 940 to forward the fax transmission to the specified new number. In some embodiments the subroutine may monitor the transmission to ensure that the transmission is successful, and if not notify the person of the failure (e.g., to allow them to specify an alternative new phone number).

After step 940, the subroutine continues to step 945 where the person is prompted to indicate whether they want to have future fax transmissions forwarded to the new phone number. In step 947 the subroutine receives an indication of a response from the person, and analyzes the response if necessary to determine the selection made. If it is determined in step 950 that the person does not want to forward future fax transmissions to the new fax number, the subroutine continues to step 955 to indicate to the person that the current fax has been forwarded. If it is instead determined in step 950 that the person wants to forward future fax transmissions to the new fax number, the subroutine continues to step 965 to indicate to the person that future faxes will be forwarded, and then continues to step 970 to store the forwarding instructions (e.g., including notifying the sender of the new phone number, updating an address entry for the recipient, adding the old and new phone numbers to a list of forwarded numbers, etc.). In other embodiments, the person may be allowed to specify additional information related to forwarding this and/or future fax transmissions, such as a time limit or effective times during which future fax transmissions are to be forwarded, indications of certain types of fax transmissions that are to be forwarded, or instructions for forwarding fax transmissions in a manner other than a fax to a new phone number (e.g., as email, telex, 2-way wireless paging, etc.). After steps 955 or 970, the subroutine continues to step 999 and returns.

Figure 10:
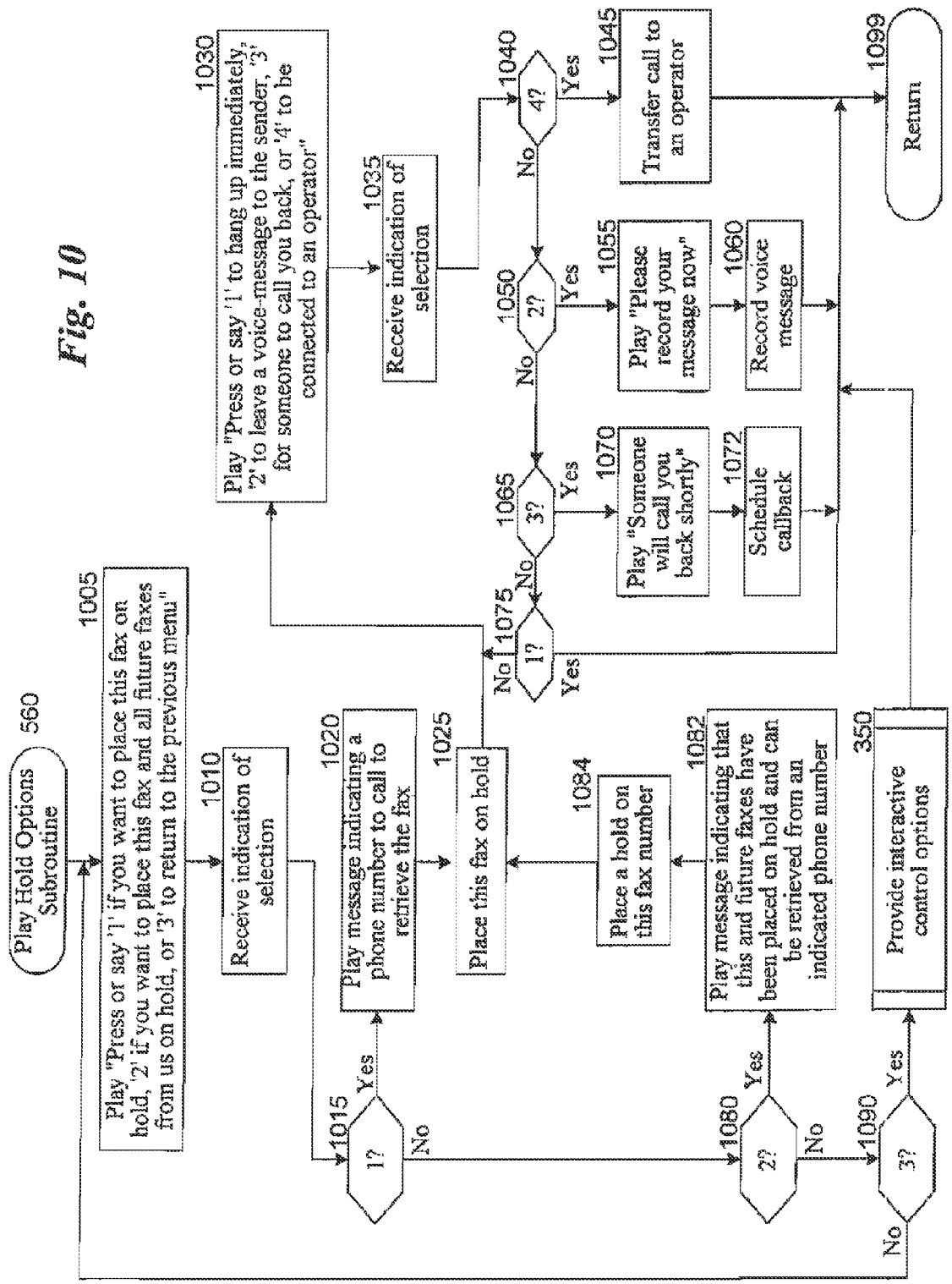
FIG. 10 is a flow diagram of an embodiment of a Play Hold Options subroutine.

FIG. 10 is a flow diagram of an embodiment of a Play Hold Options subroutine 560. The subroutine allows the person to hold this fax transmission for later retrieval, as well as to optionally indicate to similarly hold future deliveries of faxes to this phone number. The subroutine begins in step 1005 where the person is prompted to indicate whether they want to hold this fax transmission, hold this and future fax transmissions, or return to the previous menu. In step 1010 the subroutine receives an indication of a response from the person, and analyzes the response if necessary to determine the selection made. If it is determined in step 1015 that the person wants to hold this fax transmission, the subroutine continues to step 1020 to indicate to the person that the fax is being held and to provide instructions for later retrieval (e.g., a phone number to call and optionally a validation or reference code to use), and then continues to step 1025 to place the fax transmission on hold (e.g., by storing a document being transmitted on a queue or in a database of held documents). In other embodiments the fax transmission may be held only temporarily, and a retransmission of the fax may be tried at a later time (e.g., if the person does not retrieve the held fax before that time).

The subroutine next continues to step 1030 where the person is prompted to indicate whether they want to hang up immediately, to leave a voice message for the sender, to have an operator (e.g., the sender) call the person back to assist them, or to be connected to an operator immediately. In step 1035 the subroutine receives an indication of a response from the person, and analyzes the response if necessary to determine the selection made. If it is determined in step 1040 that the person wants to be connected to an operator immediately, the subroutine continues to step 1045 to transfer the call to an operator. If it is determined in step 1050 that the person wants to leave a voice message for the sender, the subroutine continues to steps 1055 and 1060 to prompt the person for a message and to record the supplied message so that it can be provided to the sender. If it is determined in step 1065 that the person wants to have an operator call them back, the subroutine continues to step 1070 to notify the person that the callback will occur and in step 1072 schedules the callback. If it is determined in step 1075 that the person wants to hang up immediately, or after steps 1045, 1060 or 1072, the subroutine continues to step 1099 and returns. If none of these options were selected, the subroutine returns to step 1030.

If it is instead determined in step 1015 that the selection indication received in step 1010 is not to hold this fax transmission, the subroutine continues to step 1080 to determine if the person wants to hold this and future fax transmissions. If so, the subroutine continues to step 1082 to indicate to the person that a hold instruction has been stored for this telephone number so that additional faxes intended for it will be held, and may provide instructions for later retrieval of held faxes. The subroutine then continues to step 1084 to place a hold on this phone number as indicated (e.g., by placing the telephone number on a list of held telephone numbers or in recipient instructions that will be consulted before performing future fax transmissions). After step 1084, the subroutine continues to step 1025. In other embodiments, the person may be allowed to specify additional information related to holding this and/or future fax transmissions, such as a time limit or effective times during which future fax transmissions are to be held or indications of certain types of fax transmissions that are to be held.

If it is determined in step 1080 that the selection indication received in step 1010 is not to hold this and future fax transmissions, the subroutine continues to step 1090 to determine if the person wants to return to the previous menu. If so, the subroutine executes a subroutine 350 to provide the previous interactive control options, and then continues to step 1099 and returns. If not, the subroutine returns to step 1005.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Figure 11:
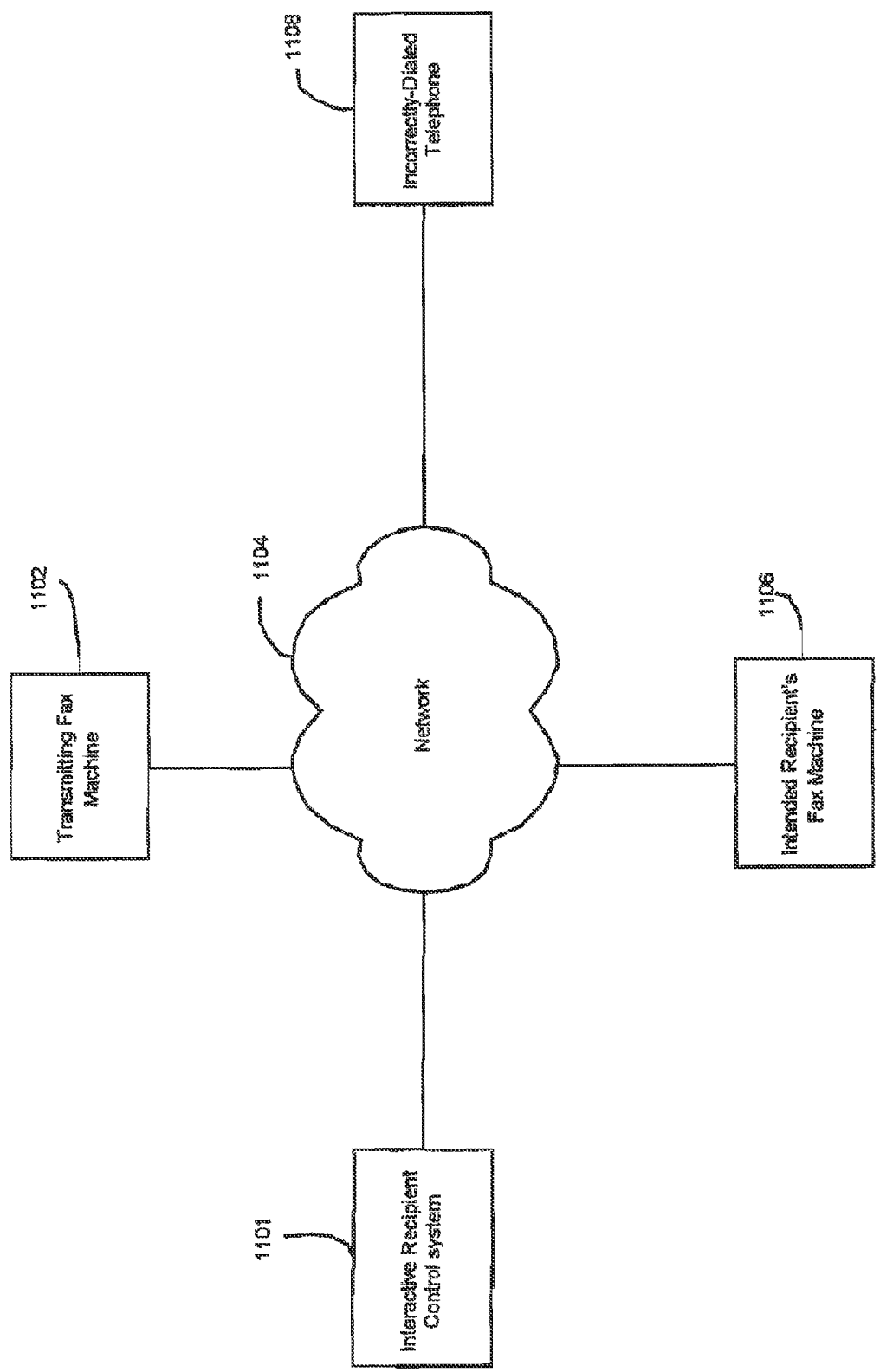
FIG. 11 illustrates an example of providing recipient transmission and routing control in conjunction with an embodiment in which a transmitting fax machine is independent of a server providing an Interactive Recipient Control system.

As an alternative to the example situation illustrated in FIG. 1, FIG. 11 illustrates an example of providing recipient transmission and routing control in conjunction with an embodiment in which a transmitting fax machine is independent of a server providing an Interactive Recipient Control system. In a similar manner to that of FIG. 1, FIG. 11 illustrates a fax machine 1102 that is attempting to send a fax transmission to a destination fax machine 1106 of an intended human recipient (not shown) via a network 1104. The network is also connected to a device 1108 of an unintended human recipient (not shown), which in the illustrated embodiment is a telephone station. When attempting to send the fax transmission to the fax machine 1106, a connection is instead erroneously made with the telephone 1108 when the unintended human recipient answers that telephone. In this illustrated embodiment, an Interactive Recipient Control system 1101 is executing separately from the transmitting fax machine, but is able to participate in the established connection (e.g., by being added as a third member of a telephone connection, such as via a conferencing feature, by taking over in place of the transmitting fax machine, such as by having the connection forwarded, by having the connection occur over a type of network in which third parties can receive information passing between other participants, such as a TCP/IP network, etc.) Upon determining that an erroneous connection has occurred (e.g., based on active monitoring or a received notification from the transmitting fax machine), the system provides interactive controls to the unintended human recipient, such as in the manner described above. After the unintended human recipient provides one or more interactive controls, the system proceeds to control the fax transmission as directed, such as by providing functionality independently of the transmitting fax machine or instead by interacting with that fax machine to provide the necessary functionality.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for transmitting a document via a phone connection, comprising:
   automatically making a call to a machine, wherein a fax server performs the calling;
   if the machine answers the call:
      transmitting the document to the machine; and
      terminating the call after transmission of the document is complete;
   if a person answers the call:
      telling the person about the transmission of the document, wherein the fax server performs the telling;
      if verification is required to deliver the document to the person, prompting the person to supply a verification code, wherein the fax server performs the prompting;
      if the verification code is received from the person, determining if the verification code is valid, wherein the fax server performs the determining;
      if the verification code is not valid, playing an error message to the person, wherein the fax server performs the playing; and
      if the verification code is valid or if verification is not required to deliver the document to the person, providing interactive voice controls to the person to transfer control of delivering the document over the phone connection from the fax server to the person.

2. The method according to claim 1, wherein the interactive voice controls comprise a plurality of options.

3. The method according to claim 2, wherein each of the plurality of options is selectable by the person utilizing the person's voice or by the person pressing a key on the machine.

4. The method according to claim 1, wherein the interactive voice controls comprise a first option for the person to cancel the delivery of the document and a second option for the person to cancel the delivery of the document and all future deliveries to a phone number associated with the machine.

5. The method according to claim 4, wherein the second option is selected by the person, further comprising:
   placing a block on the phone number associated with the machine.

6. The method according to claim 5, further comprising:
   prompting the person to specify a time limit of the block, a time duration of the block, a type of the block, or a combination thereof.

7. A computer program product comprising at least one non-transitory computer readable medium storing instructions translatable by at least one processor to perform:
   automatically making a call from a fax server to a machine;
   if the machine answers the call:
      transmitting a document from the fax server to the machine; and
      terminating the call after transmission of the document is complete;
   if a person answers the call:
      telling the person about the transmission of the document;
      if verification is required to deliver the document to the person, prompting the person to supply a verification code;

if the verification code is received from the person, determining if the verification code is valid;

if the verification code is not valid, playing an error message to the person; and if the verification code is valid or if verification is not required to deliver the document to the person, providing interactive voice controls to the person to transfer control of delivering the document over a phone connection from the fax server to the person.

8. The computer program product of claim 7, wherein the interactive voice controls comprise a plurality of options.

9. The computer program product of claim 8, wherein each of the plurality of options is selectable by the person utilizing the person's voice or by the person pressing a key on the machine.

10. The computer program product of claim 7, wherein the interactive voice controls comprise a first option for the person to cancel the delivery of the document and a second option for the person to cancel the delivery of the document and all future deliveries to a phone number associated with the machine.

11. The computer program product of claim 10, wherein the second option is selected by the person and wherein the instructions are further translatable by the at least one processor to perform:

placing a block on the phone number associated with the machine.

12. The computer program product of claim 11, wherein the instructions are further translatable by the at least one processor to perform:

prompting the person to specify a time limit of the block, a time duration of the block, a type of the block, or a combination thereof.

13. A system for transmitting a document via a phone connection, comprising:

a fax server having at least one processor and at least one non-transitory computer readable medium storing instructions translatable by the at least one processor to cause the fax server to perform:

automatically making a call to a machine;

if the machine answers the call:

transmitting a document to the machine; and terminating the call after transmission of the document is complete;

if a person answers the call:

telling the person about the transmission of the document;

if verification is required to deliver the document to the person, prompting the person to supply a verification code;

if the verification code is received from the person, determining if the verification code is valid;

if the verification code is not valid, playing an error message to the person; and if the verification code is valid or if verification is not required to deliver the document to the person, providing interactive voice controls to the person to transfer control of delivering the document over a phone connection to the person.

14. The system of claim 13, wherein the interactive voice controls comprise a plurality of options.

15. The system of claim 14, wherein each of the plurality of options is selectable by the person utilizing the person's voice or by the person pressing a key on the machine.

16. The system of claim 13, wherein the interactive voice controls comprise a first option for the person to cancel the delivery of the document and a second option for the person to cancel the delivery of the document and all future deliveries to a phone number associated with the machine.

17. The system of claim 16, wherein the second option is selected by the person and wherein the instructions are further translatable by the at least one processor to perform:

placing a block on the phone number associated with the machine.

18. The system of claim 17, wherein the instructions are further translatable by the at least one processor to perform:

prompting the person to specify a time limit of the block, a time duration of the block, a type of the block, or a combination thereof.

19. The system of claim 13, wherein the interactive voice controls comprise a plurality of options for the person to hand up, leave a voice-message to a sender of the document, schedule a callback, or transfer the call to an operator.

20. The system of claim 13, wherein the interactive voice controls comprise a plurality of options, including block, callback, cancel, forward, help, hold, read, record, restart, retry, return, send, transfer, or a combination thereof.

* * * * *